(12) United States Patent
Yonezawa

(10) Patent No.: US 6,271,805 B1
(45) Date of Patent: *Aug. 7, 2001

(54) COMMUNICATION APPARATUS AND METHOD

(75) Inventor: Hiroki Yonezawa, Tokyo (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/788,454

(22) Filed: Jan. 29, 1997

(30) Foreign Application Priority Data

Jan. 30, 1996 (JP) ................................... 8-014200

(51) Int. Cl.$^7$ ............................................. G09G 5/00
(52) U.S. Cl. ........................... 345/1; 345/327; 345/348
(58) Field of Search .................. 345/1, 2, 348, 345/349, 356, 327, 328, 329, 330, 331, 332; 364/449

(56) References Cited

U.S. PATENT DOCUMENTS

| | | | |
|---|---|---|---|
| 4,992,866 | * 2/1991 | Morgan | 340/825.06 |
| 5,036,390 | * 7/1991 | Masunaga | 358/85 |
| 5,295,244 | * 3/1994 | Dev et al. | 345/357 |
| 5,305,100 | * 4/1994 | Choi | 348/159 |
| 5,394,552 | * 2/1995 | Shirota | 713/323 |
| 5,583,796 | * 12/1996 | Reese | 364/550 |
| 5,621,429 | * 4/1997 | Yamaashi et al. | 345/119 |
| 5,625,410 | * 4/1997 | Washino et al. | 348/154 |
| 5,659,369 | * 8/1997 | Imaida | 348/556 |
| 5,751,445 | * 5/1998 | Masunaga | 358/426 |
| 5,751,959 | * 5/1998 | Sato et al. | 395/200.35 |
| 5,910,803 | * 6/1999 | Grau et al. | 345/357 |
| 6,037,936 | * 3/2000 | Ellenby et al. | 345/339 |

* cited by examiner

Primary Examiner—Richard Hjerpe
Assistant Examiner—Ronald Laneau
(74) Attorney, Agent, or Firm—Morgan & Finnegan, LLP

(57) ABSTRACT

In order to improve the operability in selectively outputting image data from a plurality of desired terminals of a plurality of video transmission terminals, a plurality of desired terminals of the plurality of video transmission terminals are designated, and the plurality of desired terminals are formed into a group. A symbol corresponding to the group is generated. Image data received from the plurality of desired terminals are output to a monitor in accordance with access to the symbol.

33 Claims, 20 Drawing Sheets

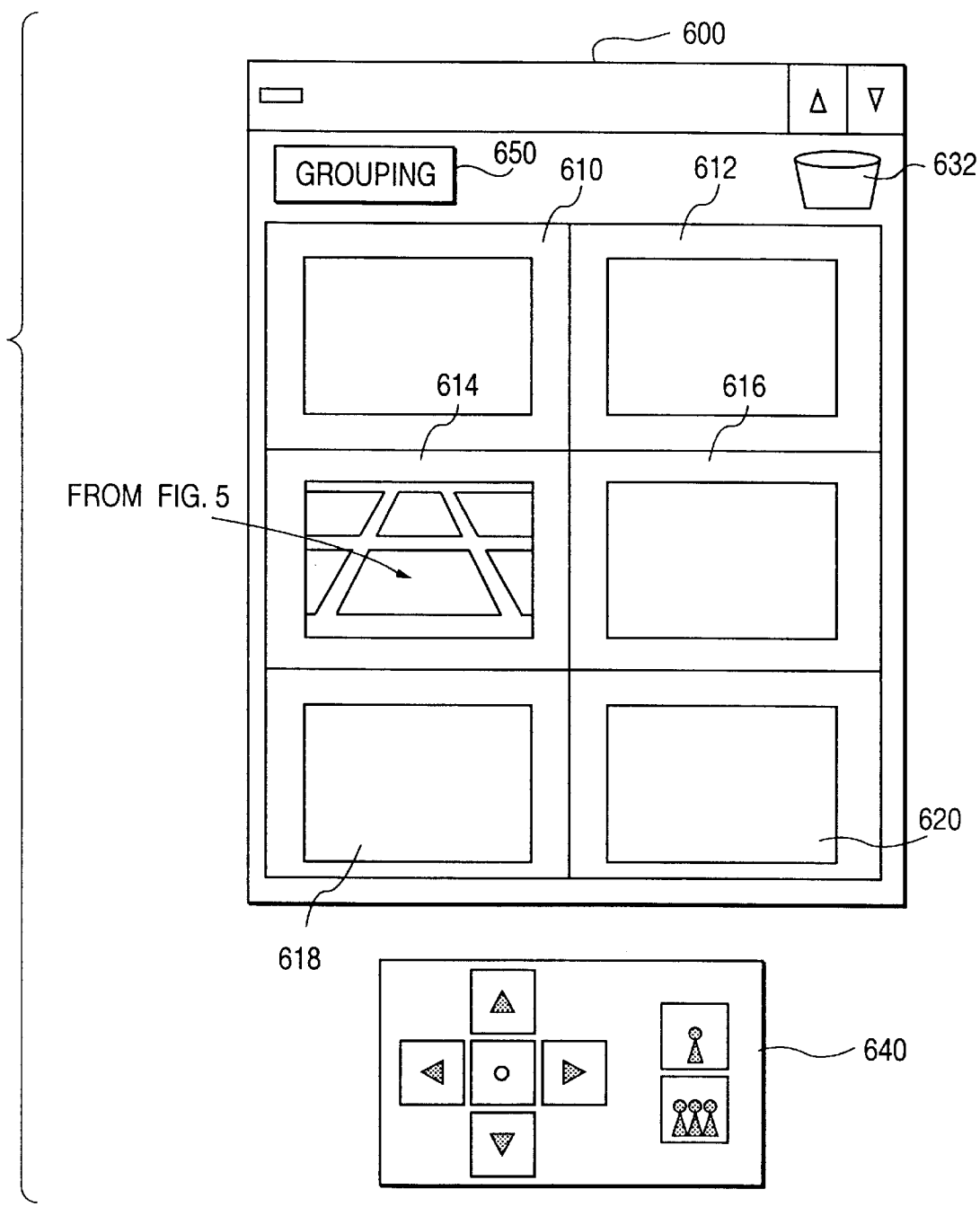

SHAPE OF MOUSE CURSOR UPON DRAG AND DROP (GROUP DISPLAY FLOW CHART)

COMMUNICATION APPARATUS AND METHOD

BACKGROUND OF THE INVENTION

1. Field of the Invention

The present invention relates to a communication apparatus and, more particularly, to a communication apparatus having a remote monitoring function and a method therefor.

2. Related Background Art

A monitoring apparatus as such a communication apparatus is constituted by several video cameras, a synthesizer for performing analog synthesis of video obtained by the video cameras, and a device called a switcher capable of selection. Such apparatuses are mainly used in relatively small buildings and referred to as local monitoring systems. In contrast to the local monitoring systems, remote monitoring systems, which use digital networks such as LANs and ISDNs as video transmission lines instead of analog cables to allow great extension of transmission lines, have recently been developed.

The recently proposed monitoring systems include several types of systems which use IBM PC-compatibles (PCs) as monitoring terminals, and realize video display and system control by means of a Graphical User Interface (GUI). The use of a GUI based on a computer for a monitoring apparatus allows an unskilled user to easily handle the apparatus.

Although a conventional system of this type uses a digital network as video transmission lines, the display position of each camera video strongly depends on the hardware of the system because analog display is performed on the monitor. For this reason, the display positions of camera video are permanently assigned to specific video display portions on the monitoring terminal upon installation of the system. Therefore, the observer as a user cannot arbitrarily arrange the video display positions to facilitate control of the system and cannot easily select a camera video to be displayed.

SUMMARY OF THE INVENTION

The present invention has been made in consideration of the above points, and has an object to provide a communication apparatus and method which allow the user to easily handle the apparatus.

It is another object of the present invention to provide a communication apparatus and method which provide necessary information for the user by means of a graphical interface.

It is still another object of the present invention to provide a communication apparatus and method which allow the user to easily observe an image received from an image generator.

It is still another object of the present invention to provide a communication apparatus and method which improve operability in selectively displaying images received from a plurality of video transmission terminals.

In order to achieve the above objects, according to the present invention, there is provided a communication apparatus, as a preferable example, comprising designating means for designating a plurality of desired terminals of a plurality of video transmission terminals, generating means for forming the plurality of desired terminals into a group and generating a symbol corresponding to the group, and output means for outputting image data received from the plurality of desired terminals to a monitor in accordance with access to the symbol.

It is still another object of the present invention to provide a communication apparatus and method which include novel functions.

BRIEF DESCRIPTION OF THE DRAWINGS

FIG. 6 is a view showing how a video is displayed upon drag and drop;

DETAILED DESCRIPTION OF THE PREFERRED EMBODIMENTS

First Embodiment

The first embodiment of the present invention will be described in detail below with reference to the accompanying drawings.

Figure 1:
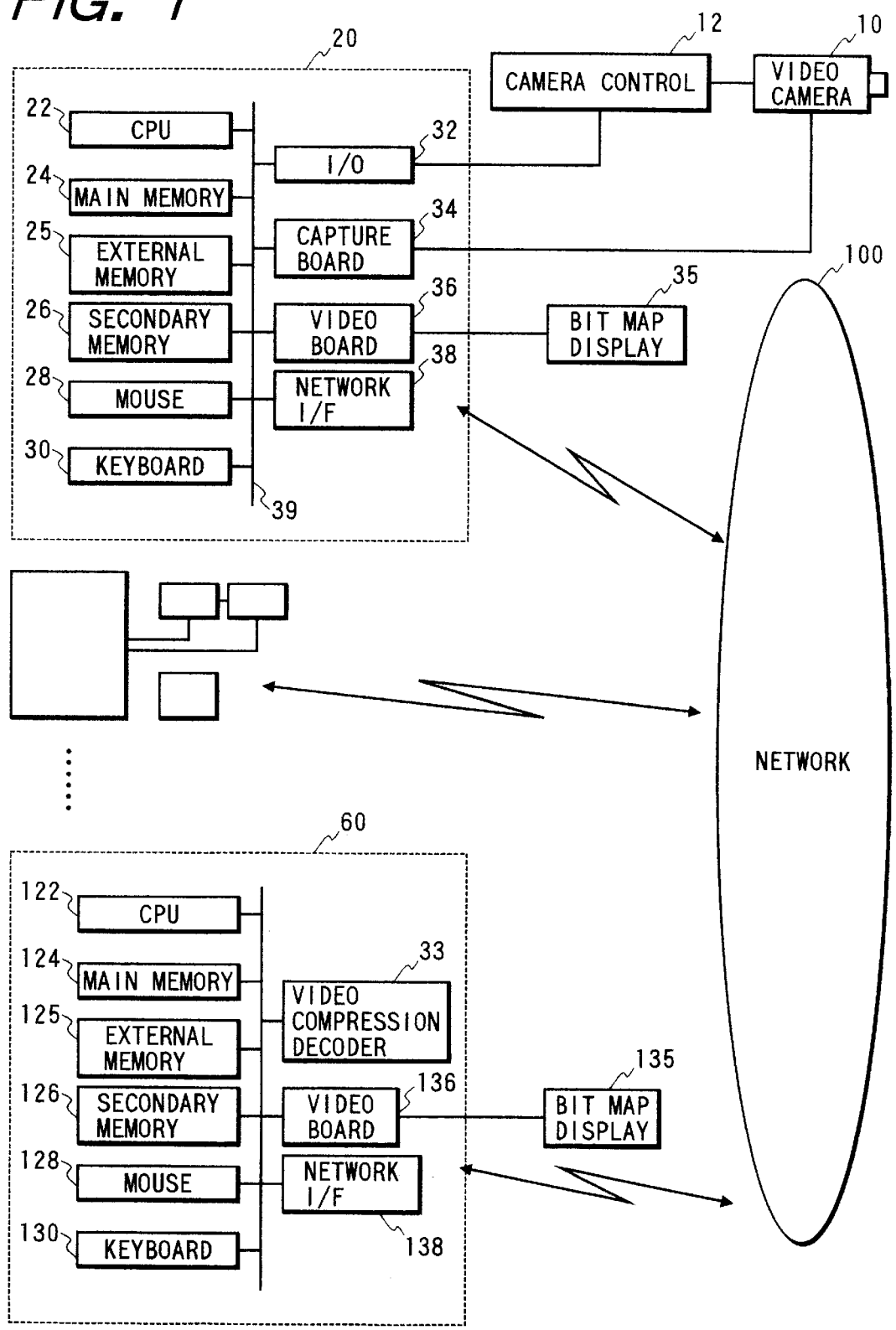
FIG. 1 is a block diagram showing terminals in an embodiment of the present invention.

FIG. 1 is a block diagram showing the schematic arrangement of a terminal according to the first embodiment of the present invention. The video transmission terminal of this embodiment is used together with a video camera as an image signal generator. The terminal receives a video camera control signal from a monitoring terminal serving as a video reception terminal, and actually controls the video camera. The terminal also performs A/D conversion and data compression of a video signal from the video camera, and transmits the resultant data to a network.

Referring to FIG. 1, a camera control circuit 12 directly controls panning, tilting, zooming, focus adjustment, aperture adjustment, and the like of a video camera 10 in accordance with an external control signal. For example, a control signal to the camera control circuit 12 is input through an interface defined by RS-232-C, IEEE 394, USB (Universal Serial Bus), or the like.

When panning, tilting, and the like of the video camera 10 cannot be controlled, the camera control circuit 12 need not be used. However, the camera control circuit 12 may be used to perform ON/OFF control of the power supply to the video camera 10. A computer 20 controls the video camera 10 connected to the camera control circuit 12 by sending a control code to the camera control circuit 12, and transmits video data obtained from the video camera 10 to the network through a network interface 38. For example, a workstation (WS) or a personal computer (PC) may be used as the computer 20. The arrangement of the computer 20 in this embodiment will be described next. The computer 20 includes a CPU 22 for controlling the overall system, a main memory 24, a secondary memory 26 such as a hard disk, and a mouse 28 as a pointing device. In this embodiment, the pointing device is not limited to the mouse, and another device may be used. For example, a touch panel on a bitmap display 35 may be used. The computer 20 also includes a keyboard 30 and a detachable external memory 25 such as a floppy disk or CD ROM. Software programs for this system may be read out from these media and the network interface 38 and stored in the secondary memory 26. In addition, the computer 20 includes an I/O board 32 which connects the camera control circuit 12 to the computer 20 so as to transmit/receive camera control signals, and a video capture board 34 for capturing a video output signal VD from the video camera 10. As a video output signal, an analog signal such as an NTSC signal or a digital signal may be used. If an analog signal is used, the I/O board 32 needs to have an A/D conversion function. Although the video capture board 34 need not have a data compression function, if the video capture board 34 has no compression function, software compression is preferably performed. As this compression method, Motion JPEG, H261, MPEG, or the like may be used. A captured video is output from the video capture board 34 to a video board 36 through a bus 39 and displayed at an arbitrary position on the bitmap display 35. Such display position control is performed by the CPU 22, which instructs the video board 36 about the display position and/or area. The bus 39 connects the respective devices, ranging from the computer 20 to the network interface 38, to each other.

With the above arrangement, a video can be transmitted to a monitoring terminal in a remote place through a network 100, and camera control can also be performed upon reception of a camera control signal from the monitoring terminal. FIG. 1 also shows the schematic arrangement of a monitoring terminal (video reception terminal) 60. The monitoring terminal 60 transmits a control signal for the video camera 10 to the video transmission terminal 20. The video transmission terminal 20 controls the video camera 10 in accordance with this control signal, and returns the resultant data representing the state of the video camera 10. The monitoring terminal 60 displays the state of the associated video camera on, for example, a bitmap display 135. The monitoring terminal 60 receives video data sent from the video transmission terminal 20, and melts the compressed data by software processing, i.e., expands the coded data, to display the data on the display device in real time. As is seen from FIG. 1, the arrangement of the monitoring terminal 60 is the same as that of the video transmission terminal 20 except for the video camera 10, the camera control circuit 12, and the video capture board 34. The elements having the same functions as those in the video transmission terminal 20 are denoted by corresponding reference numerals with "100" being added. As is apparent, the above elements need not be omitted. If the throughput of a CPU 122 is low, and it takes time to melt the data, the monitoring terminal 60 may include expansion hardware having a melting function.

With the above arrangement, a video from the video transmission terminal 20 at the remote place can be received through the network 100, and the received data can be melted and displayed at an arbitrary position on the bitmap display 135, i.e., the monitor display device. In addition, a video camera control code corresponding to a control instruction for the video camera which is input by the user with a keyboard 130 or a mouse 128 can be transmitted to the video transmission terminal.

Figure 2:
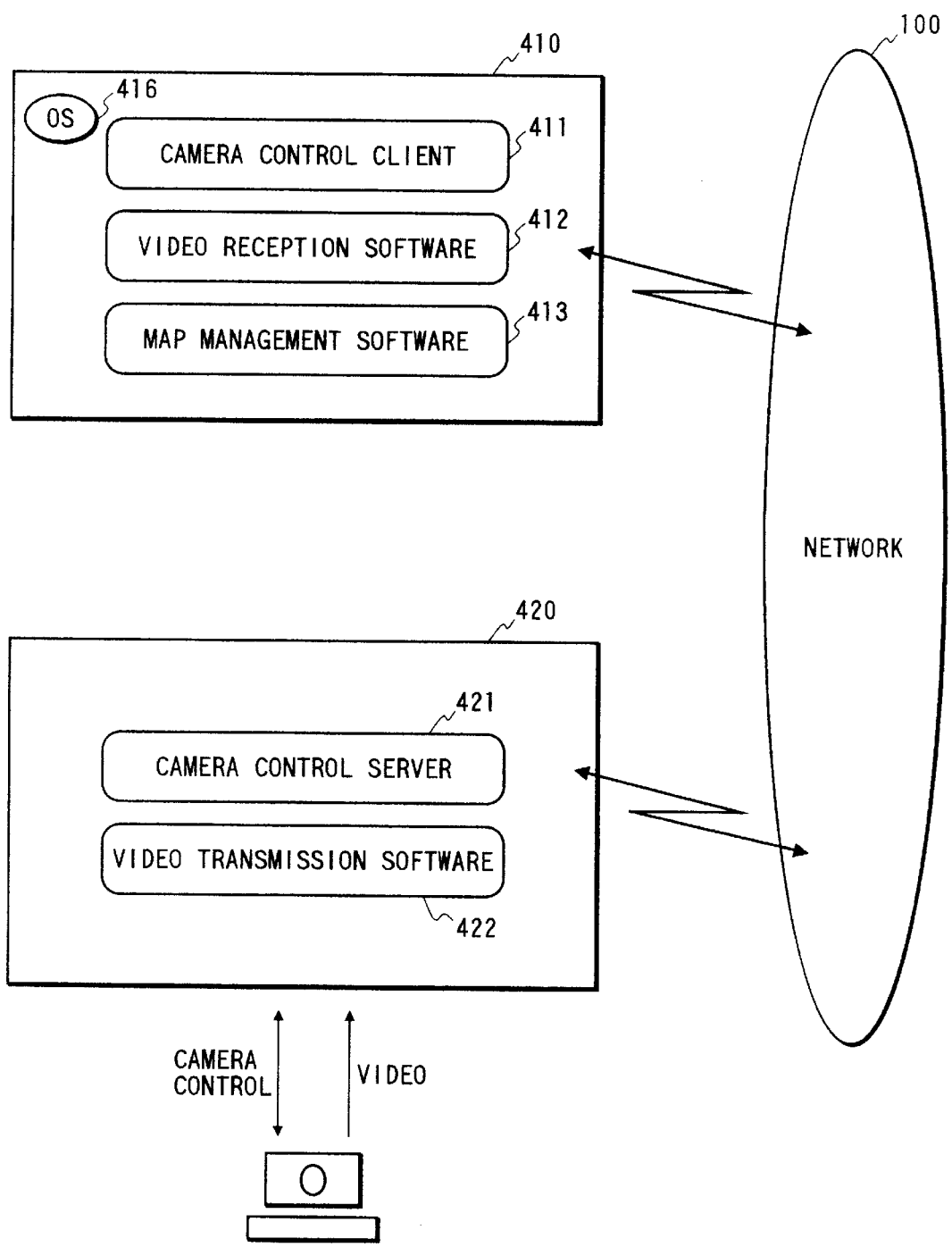
FIG. 2 is a block diagram showing pieces of software in the embodiment.

FIG. 2 shows a software arrangement in this embodiment. Software 410 for the monitoring terminal 60 and pieces of software 420, . . . for a plurality of video transmission terminals 20 are connected to the network 100. A camera control client 411, video reception software 412, and map management software 413 are installed in the software 410 for the monitoring terminal. The camera control client 411 performs remote control of the cameras respectively connected to the pieces of software 420, . . . for the video transmission terminals. The video reception software 412 melts video data sent in the form of packets from the video transmission terminals and displays the resultant data. The map management software 413 has a GUI which displays graphic patterns expressing the panning and zooming states of the cameras with maps and camera symbols (i.e., performs graphic display) and can perform camera control. The video reception software 412 has a dominant role in managing the cameras of all the video transmission terminals connected to the network 100, and holds pieces of information about the cameras, e.g., the names of the respective cameras, the host name of the computer to which the cameras are connected, the camera states such as panning/tilting and zooming, and information indicating whether each camera can be controlled, and pieces of information representing the current state, e.g., information indicating a specific camera which is currently controlled and information indicating a specific camera a video from which is being displayed. These pieces of information are shared by the camera control client 411 and the map management software 413 and used to, for example, change the display of a camera symbol.

Figure 3:
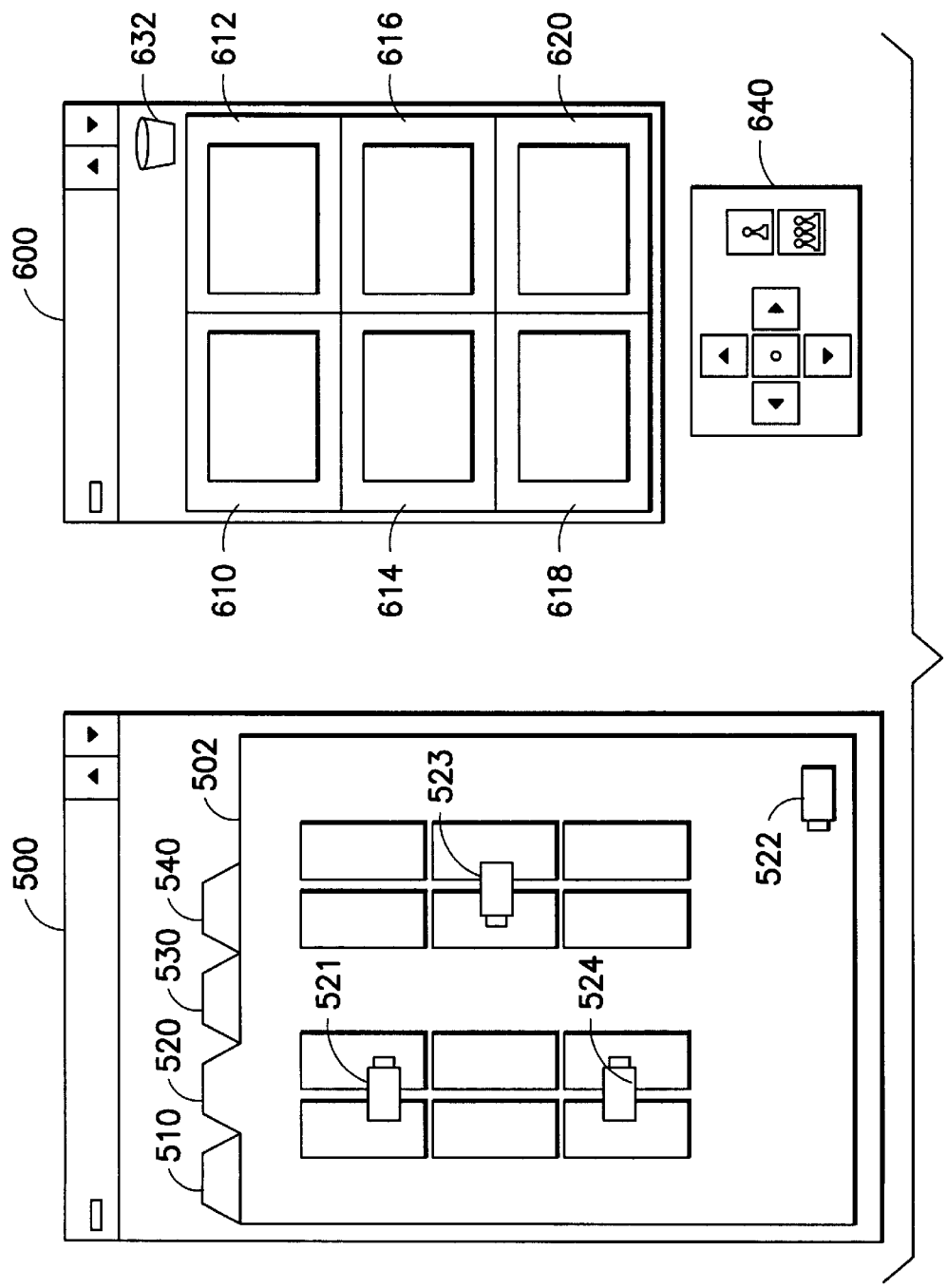
FIG. 3 is a view showing screen samples in the embodiment.
Figure 4:
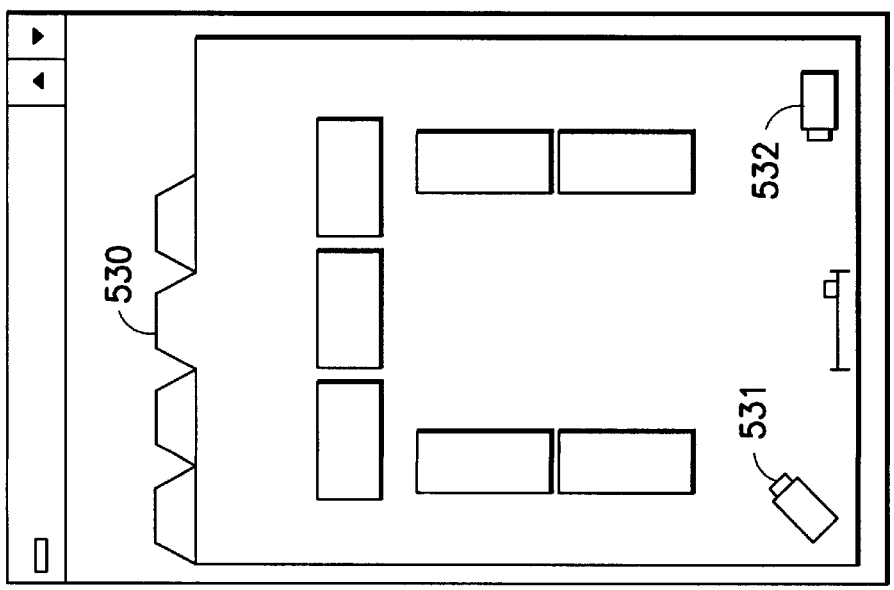
FIG. 4 is a view showing a state upon switching to a map 530.

FIG. 3 shows a screen displayed on the bitmap display 135 of the monitoring terminal 60. A map window 500 is used to manage a plurality of maps 520, 530, 540, . . . indicating maps of different places such as offices, stores, and warehouses or layouts at different positions in the same place, such as the first and second floors. The number of maps depends on the performance of the system but is not specifically limited. Tags are added to the respective maps. When a given tag is clicked with the mouse pointer, the map having the tag is displayed in a map display area 502. At the same time, the camera symbols arranged on the map are also displayed. FIG. 3 shows a state wherein the map 520 of a map 510 and the maps 520, 530, and 540 is displayed in the map display area 502. In this state, camera icons 521, 522, 523, . . . arranged on the map 520 are displayed. In this case, if the tag of the map 530 is clicked, the map 530 is displayed in the map display area 502, as shown in FIG. 4. At the same time, camera icons 531, 532, . . . arranged on the map 530 are displayed.

The map 510 is a special map referred to as a group map. The group map is not subjected to layout display and includes lists of icons called group icons. This group icons will be described in detail later.

FIG. 6 shows a window 600 for displaying an input video signal. FIG. 6 shows a case wherein a video signal received through the network 100 is displayed on the window.

Figure 7:
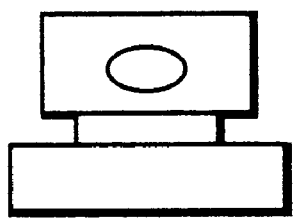
FIG. 7 is a view showing the shape of a mouse cursor in a drag and drop operation.
Figure 9:
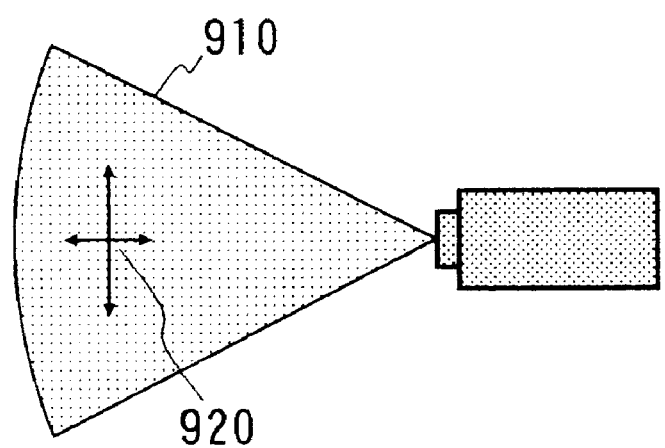
FIG. 9 is a view showing a display sample of a camera icon during display of a video.

Referring to FIG. 6, the video display window 600 includes video display areas 610, 612, 614, 616, 618, 620, . . . . In this embodiment, six video display areas are arranged. However, the number of video display areas is not limited to this. The map window 500 in FIG. 3 and the video display window 600 in FIG. 6 may be displayed on the same screen, or may be displayed on different screens, i.e., may be separately displayed on different monitor units. For the sake of easy understanding, assume that the video display window 600 and the map window 500 are displayed on the same screen. An ash can icon 632 is used to delete the video data of the camera displayed from the video display area. A camera control panel 640 has various camera control buttons and the like. With the panel 640, panning/tilting and zooming of a selected camera can be controlled. The panel 640 may also be displayed on the same screen on which the windows 500 and 600 are displayed, or may be displayed on a different screen. A detailed description of this arrangement will be omitted because it is irrelevant to the gist of this embodiment. The graphical user interface (GUI) of the monitoring system of this embodiment will be described next with reference to FIGS. 6 to 10. In this embodiment, when the camera icons on the maps 520, 530, . . . are dragged and dropped (to be abbreviated as "D & D") in arbitrary video display areas in the video display window, moving images or motion pictures from the cameras corresponding to the D & D icons are displayed in the video display areas in which the camera icons are D & D. FIG. 6 shows a state wherein the video camera 523 is D & D in the video display area 614. While the camera icon is dragged, the mouse cursor has the shape of a camera, as shown in FIG. 7, thus allowing the user to recognize that the camera icon is being D & D. At this time, the map management software 413 searches for the ID number of the camera on the basis of the position information of the dragged camera, and notifies the video reception software 412 of the ID of the D & D camera. On the basis of this ID, the video reception software 412 checks the panning/titling state of the camera, the camera name, and the name of the host to which the camera is connected, and notifies the camera control client 411 and the map management software 413 of these pieces of information. The camera control client 411 connects itself with the camera control server of the video transmission terminal, to which the camera is connected, through the network, on the basis of the above information. Subsequently, camera control is performed on both sides. The camera control client 411 always notifies the video reception software 412 of pieces of information about panning/tilting, zooming, and the like which represent the current state of the camera. In accordance with the pieces of information about panning/tilting, zooming, and the like, the map management software 413 updates the map, e.g., changing the direction of the camera icon in accordance with the actual direction of the camera, drawing a scope 910 indicating that the corresponding data is being displayed as shown in FIG. 9, or drawing a control pointer 920 for control on panning/tilting, and zooming of the camera in the scope 910.

Figure 8:
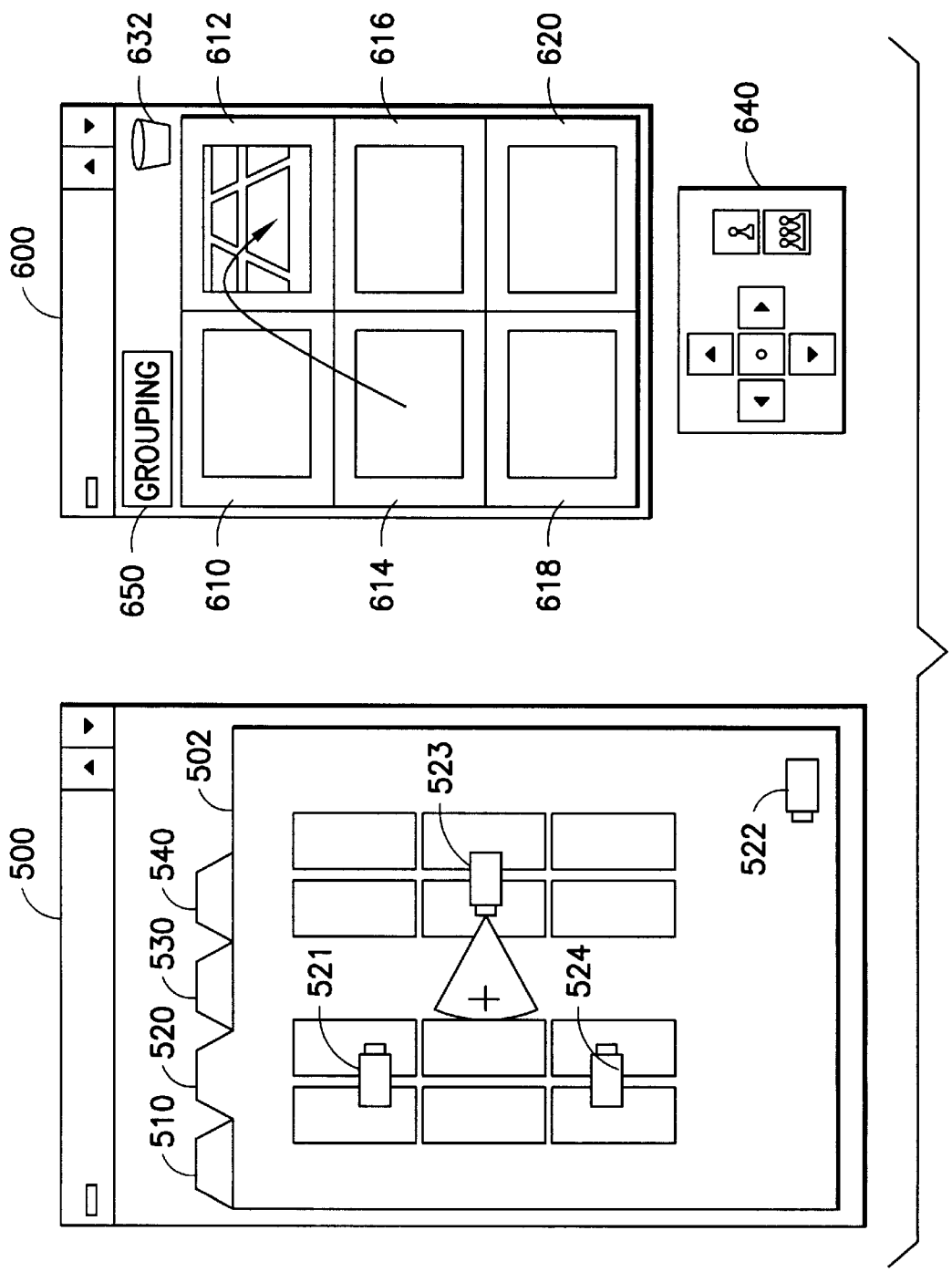
FIG. 8 is a view showing a state wherein the display area of a video is changed upon drag and drop.

The map management software 413 is always notified of information indicating the state of the camera, e.g., panning/tilting and zooming of the camera, from the video reception software 412. When the state of a camera, e.g., panning/tilting or zooming of a camera is changed by the camera control panel 640, the result is immediately reflected in a corresponding one of the camera icons 521, 522, 523, . . . , 531, 532, 533 . . . . In practice, a video signal is transmitted in response to a request from the video reception software 412. The video reception software 412 requests video transmission software 422 of the video transmission terminal to which the associated camera is connected to transmit one-frame data through the network 100. Upon reception of this request, the video transmission software 422 segments the latest frame of the captured data to encapsulate the frame in a plurality of packets, and transmits the packets to the video reception software 412 to process them. The video reception software 412 reconstructs the frame from the plurality of packets and displays it in the video display area. The video reception software 412 then issues a video transmission request again. By repeating this operation, a video in a remote place is transmitted through the network and displayed. Note that video from a plurality of cameras can be displayed by sequentially and repeatedly performing the following process for each piece of video transmission software to which each camera is connected: issuing a video transmission request, compressing the captured video, dividing the data into packets, transmitting the packets through the network, receiving the packets, reconstructing the frame, melting the data, and displaying the resultant data. The display position of a given camera video can be moved when the video is D & D in the desired video display area, as shown in FIG. 8. FIG. 8 shows a state wherein the video obtained by the video camera 523 and displayed in the video display area 614 is moved to the video display area 612.

Figure 10:
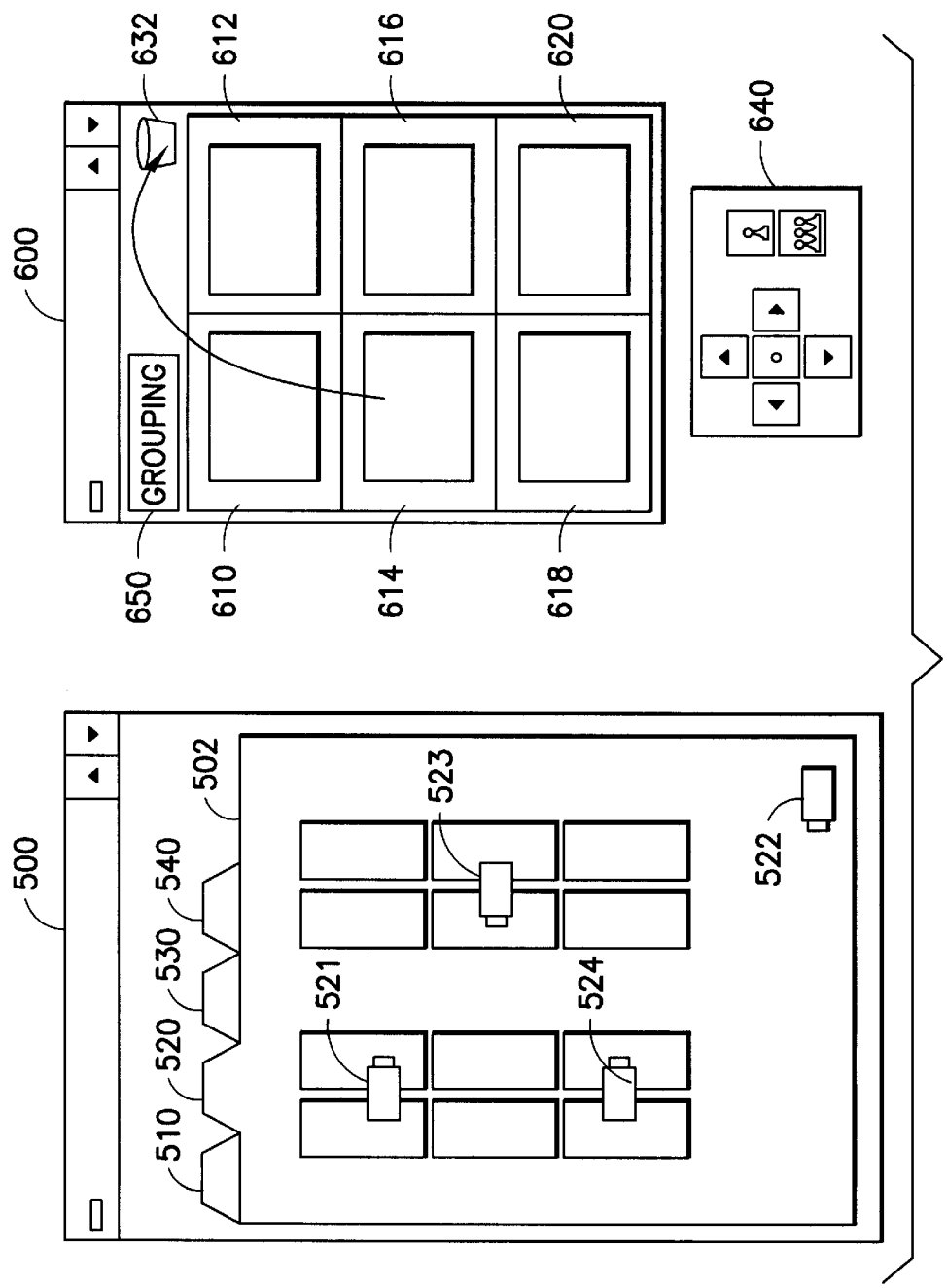
FIG. 10 is a view showing a state wherein display of a video is stopped by a drag and drop operation.

In this case, the video reception software 412 clears the video display area in which the video has been displayed, and changes the internal parameter to determine the target D & D area in which the video is to be displayed. From then on, the video is displayed in the determined D & D area. Note that the logical network connection is not broken by this operation. Once the network is connected, the network connection is maintained until the video display area is D & D in the ash can icon 632, as will be described later. Display of a camera video can be stopped when the video display area in which the video is being displayed is D & D in the ash can icon 632 in the video display window, as shown in FIG. 10. FIG. 10 shows a state wherein display of the video obtained by the video camera 523 and displayed in the video display area 614 is stopped. In this case, the video reception software 412 clears the associated video display area, and stops issuing a video transmission request to the associated video transmission software. In addition, the video reception software 412 notifies the camera control client 411 and the map management software 413 that the display is stopped. Upon reception of this notification, the camera control client 411 breaks the network connection to a camera control server 421. The map management software 413 removes the scope display from the camera icon 523 of the associated camera, and updates the map.

With the above arrangement, display, stop of display, and control of video from the respective cameras present on each map can be flexibly performed. If, however, video from a plurality of desired video cameras included in the same map or different maps are to be simultaneously displayed, the camera icons corresponding to the camera video to be displayed must be sequentially D & D from one or a plurality of maps.

If, for example, the same combination of camera video is to be displayed again, the camera video corresponding to the desired cameras included in the same map or different maps must be searched out and D & D again.

With the above arrangement, the operability of the system is not necessarily high.

Group icons solve such a problem. As a group icon, a combination of the IDs of one or more cameras which provide video to be displayed, and the serial numbers of video display areas is registered in the main memory 24. When this group icon is D & D in a video display area, the video picked up by the grouped cameras can be displayed at once. After grouping is performed, and a desired group icon is D & D, display is executed in the following manner. The video reception software holds data indicating correspondence between the grouped cameras and the display positions on the video display window, a desired group icon is D & D, and the corresponding video are displayed in accordance with the correspondence under the control of the CPU 122.

Figure 11:
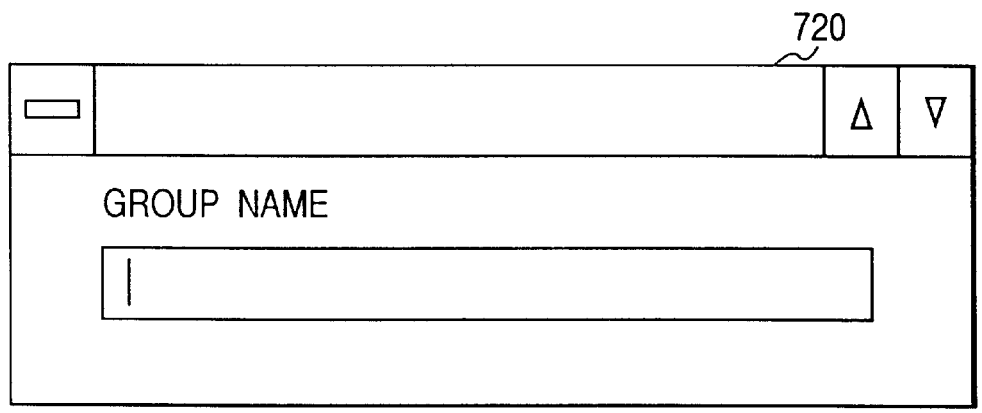
FIG. 11 is a view showing a dialog box for inputting a group name.
Figure 12:
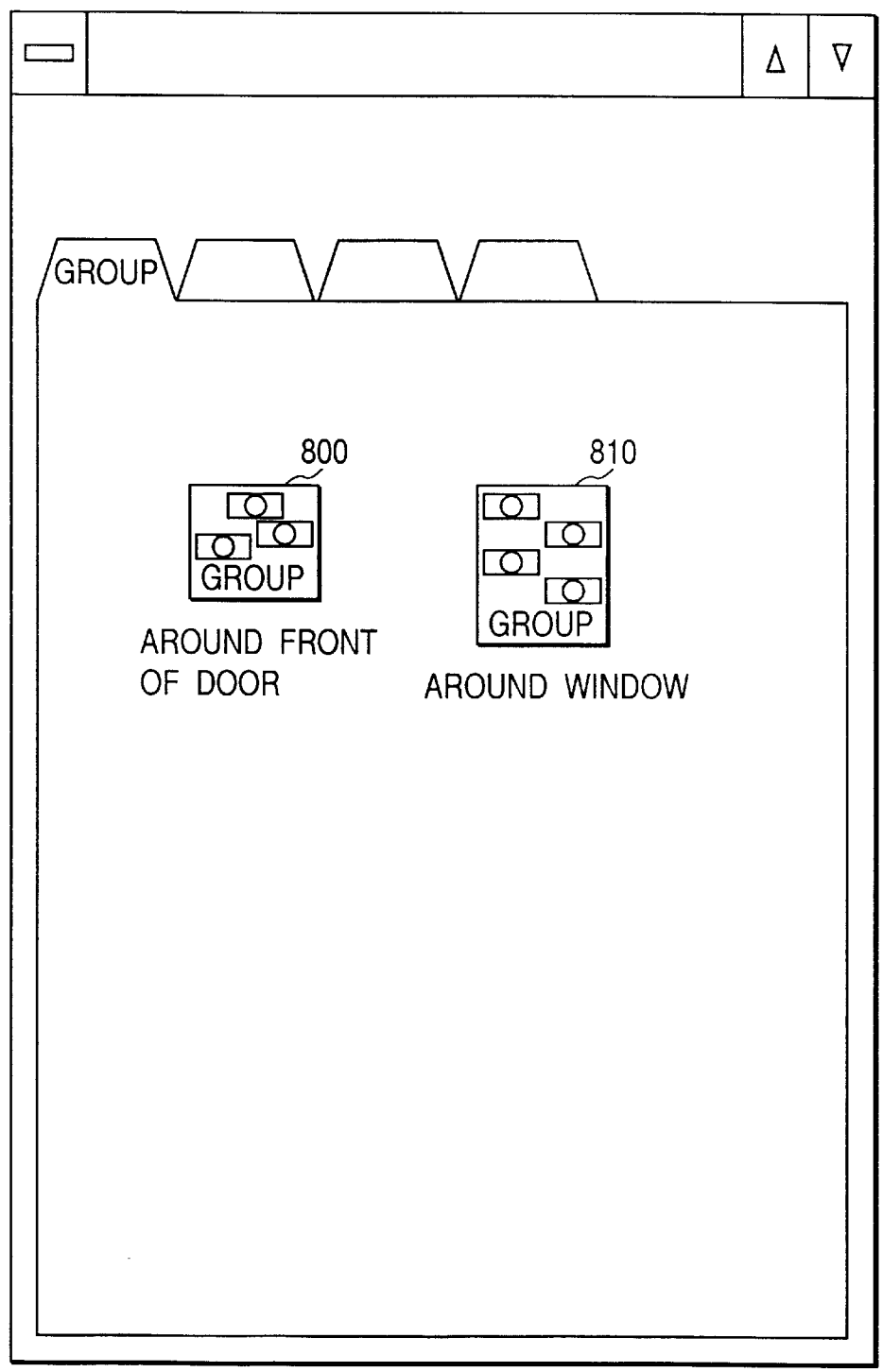
FIG. 12 is a view showing a group map.

A method of forming group icons will be described next. First of all, the video from cameras to be grouped are D & D from one or a plurality of maps to video display areas to be displayed on the camera control circuit 12. When a grouping button 650 on the video display window 600 is clicked, a dialog box for inputting a group name is displayed, as shown in FIG. 11. This dialog box may be displayed on the same screen on which the map window and the video display window 600 are displayed, or a different screen, i.e., a different monitor. When a group name is input with the keyboard 130, a group icon 800 with the input name is formed on the group map of the map window, as shown in FIG. 12. As is apparent, the group "around front of door" is set as an example, as shown in FIG. 12, but the group is not limited to this.

A group icon 810 is the group "around window" which has previously been formed.

The group icon 800 in FIG. 12 has the group name "around front of door", in which a camera 522 on the map 520 and a camera 532 on the map 530 are registered.

The cameras registered in a group icon can be displayed at once by drag and drop the group icon to the video display window. The state of the video display window upon grouping, i.e., the video displayed in the video display areas, are reproduced in the same manner as when grouping was performed.

Figure 13:
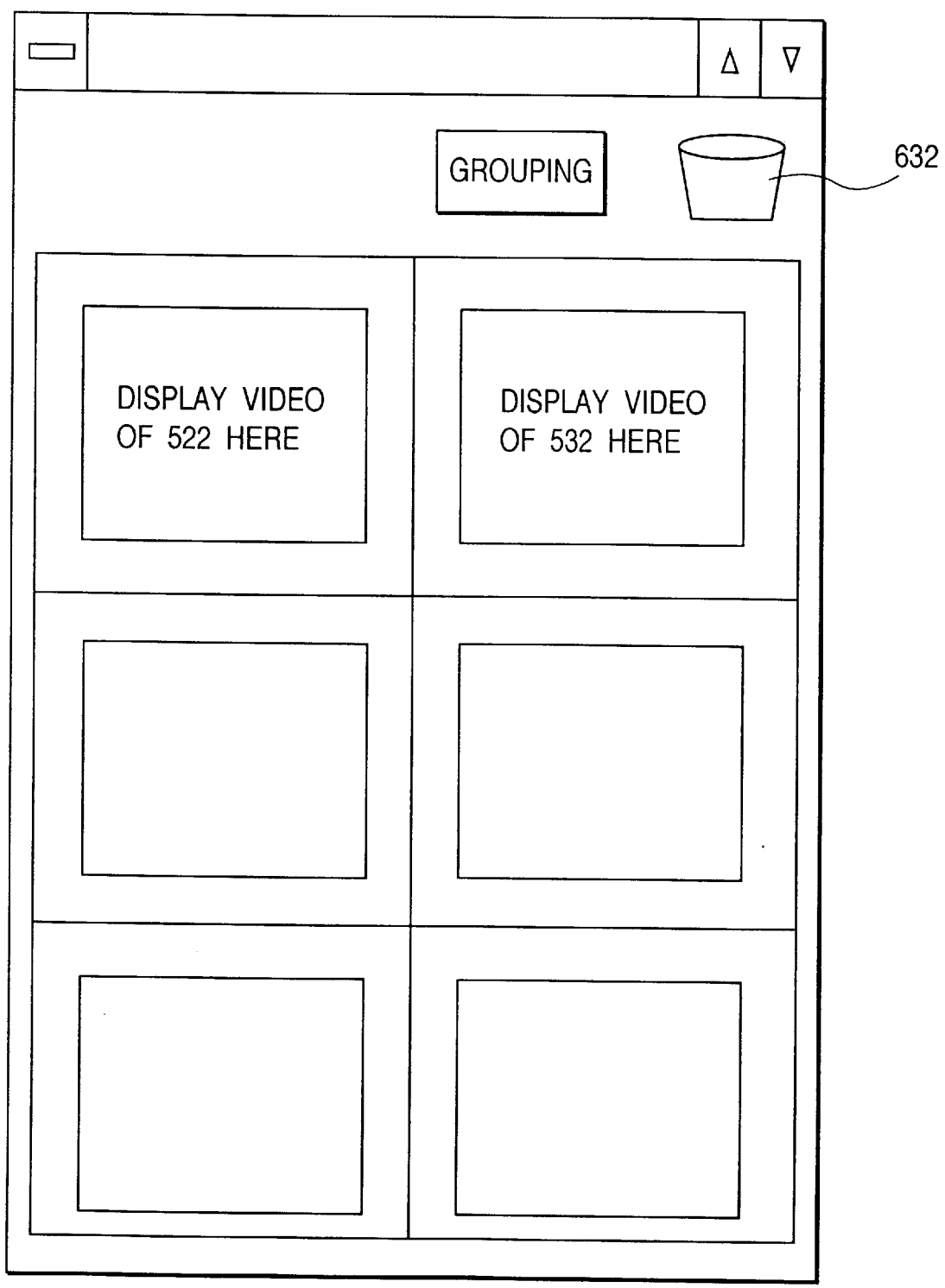
FIG. 13 is a view showing a state wherein a group icon is displayed by a drag and drop operation.

FIG. 13 shows a state wherein video corresponding to the group icon "around front of door" are displayed.

A group icon is effective only when batch display is performed. After batch display is performed, the same state as that set when the camera icons are sequentially D & D is set. The procedure for stopping display in the algorithm for requesting video display is the same as in the case of camera icons. As is apparent, the operation for display of video on the video display window is not limited to drag and drop of the group icon 800, and other methods such as double clicking may be used.

With the above arrangement, video from a plurality of cameras connected to the same synthesizer and the same switcher and arranged on one map can be simultaneously displayed on the monitor, and other batch processes can be performed. In addition, batch processes for cameras on different maps can be performed without re-wiring the video cables for the cameras. For example, video can be simultaneously displayed or controlled not to be displayed. For this reason, not only cameras on the same map or at geographically limited points but also cameras on different maps can be handled as a group, thereby flexibly meeting user requirements.

The operation of the above apparatus of this embodiment will be described below with reference to the flow charts.

Figure 15:
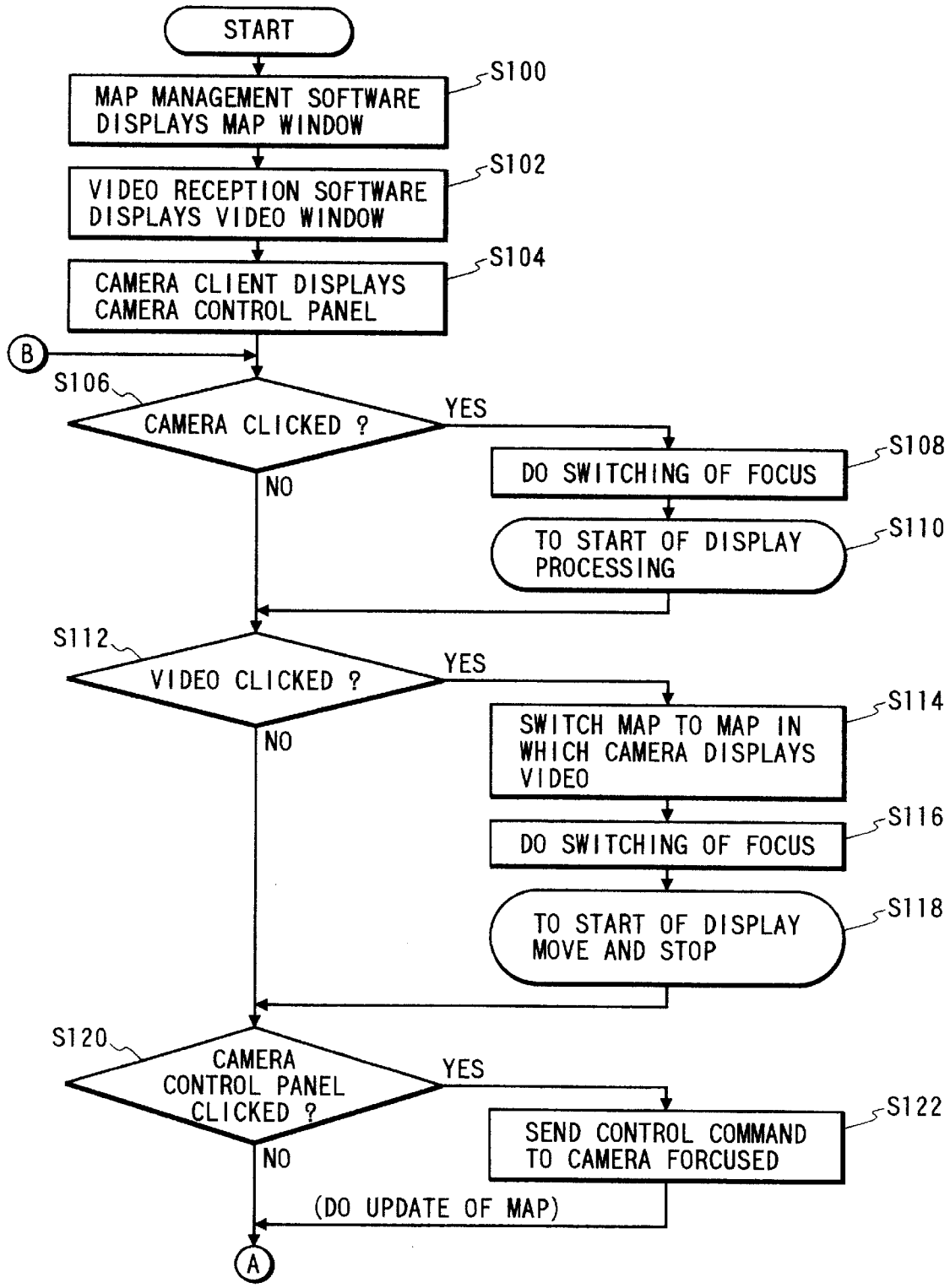
FIG. 15 is a main flow chart for the apparatuses of the first and second embodiments.
Figure 16:
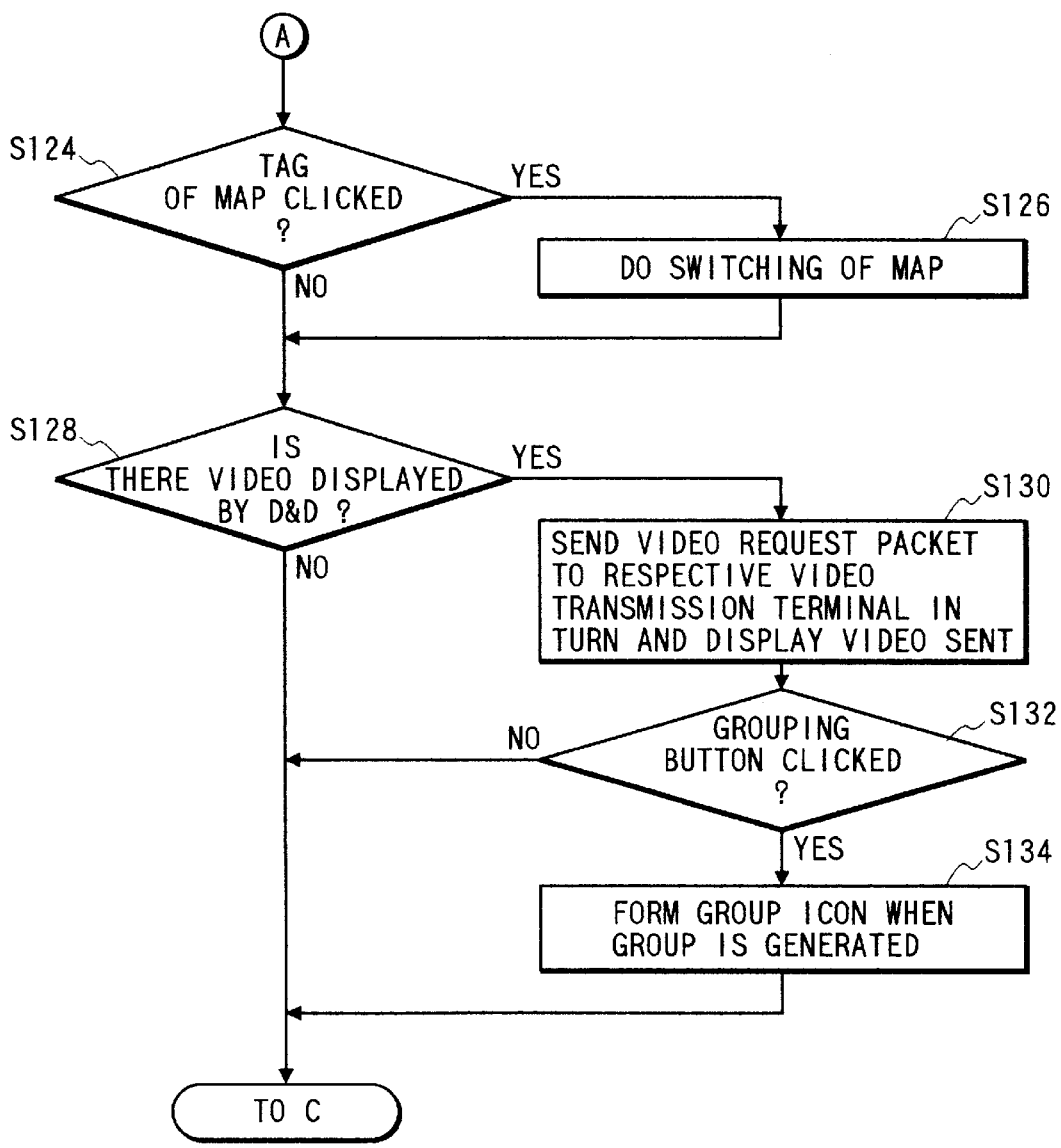
FIG. 16 is a main flow chart for the apparatuses of the first and second embodiments.
Figure 17:
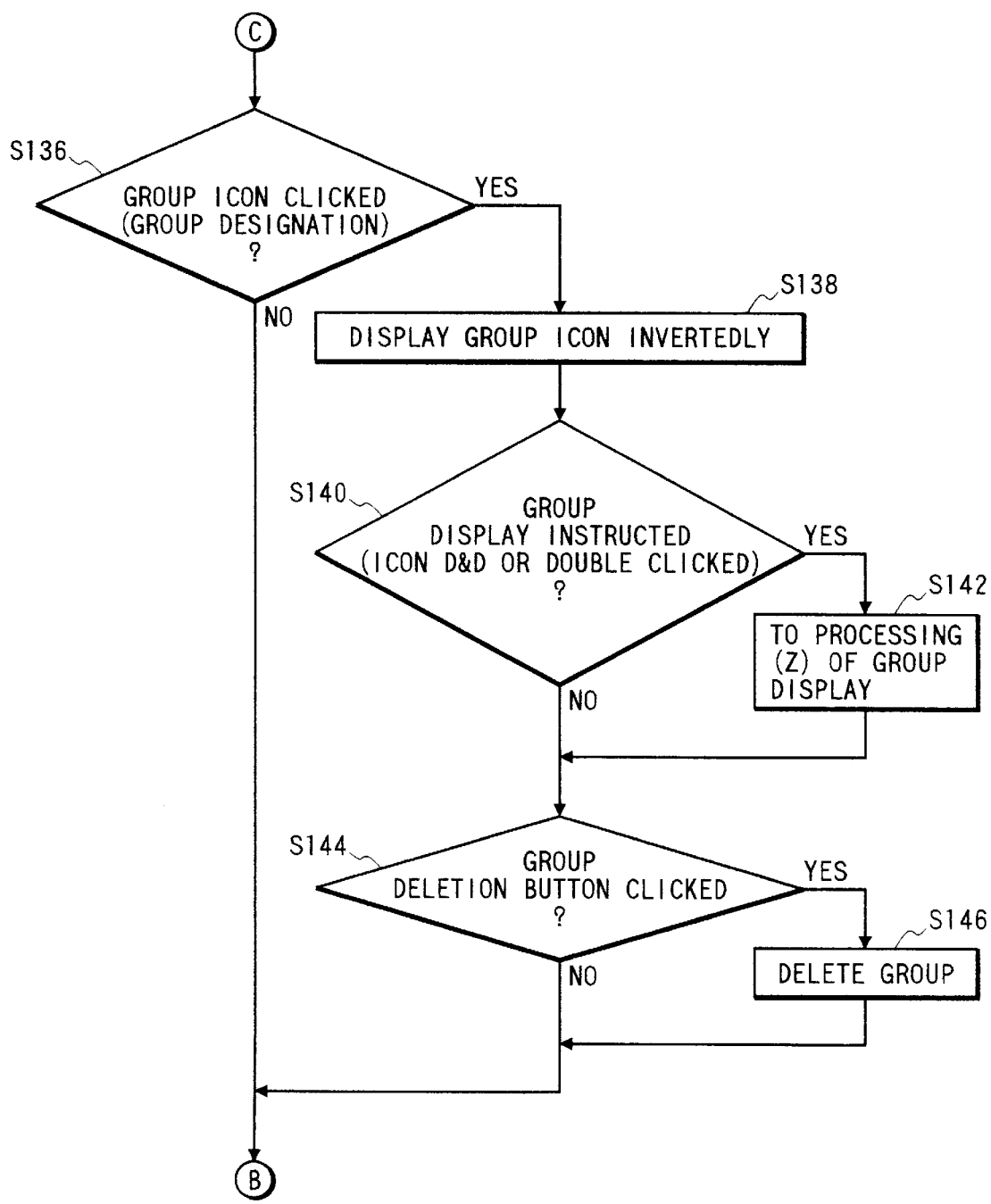
FIG. 17 is a main flow chart for the apparatuses of the first and second embodiments.

FIGS. 15 to 17 are flow charts showing the overall operation of the apparatus of this embodiment.

The respective steps in the flow charts will be described below.

In step S100, for example, the map management software 413 in FIG. 2 displays the map window 500 in FIG. 3 on the bitmap display 35.

Figure 5:
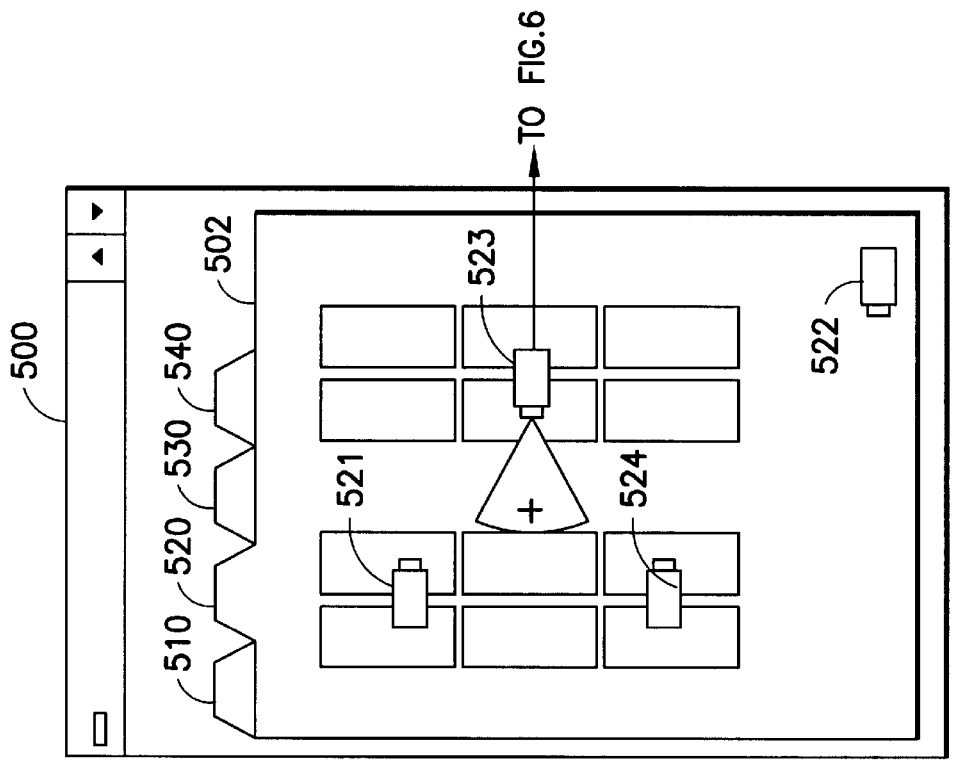
FIG. 5 is a view showing a window 600 on which an input video signal is displayed.

After step S100, for example, the video reception software 412 in FIG. 2 displays the video window 600 in FIG. 5 on the bitmap display 35 in FIG. 2 in step S102.

After step S102, the camera control client 411 in FIG. 2 displays the camera control panel 640 in FIG. 6 on the bitmap display 35 in step S104.

In step S106, it is checked whether any of the camera icons displayed on the map window in FIG. 3 is clicked. If YES in step S106, the flow advances to step S108. If NO in step S106, the flow advances to step S112.

Note that each step in FIG. 15 is executed by the OS corresponding to the CPU 122. According to the above description, steps S100, S102, and S104 are separately executed. However, in step S100, the routines corresponding to steps S102 and S104 may be called and executed.

In step S108, switching of the focus corresponding to the clicked point is performed. That is, the camera corresponding to the clicked point is confirmed. With this operation, a specific camera is determined as the selected camera.

In step S110, the display processing routine to be described later is started. This routine will be described later with reference to FIG. 18.

In step S112, it is checked whether the desired video of the video displayed on the video window 600 in FIG. 5 is clicked. If YES in step S112, the flow advances to step S114. If NO in step S112, the flow advances to step S120.

In step S114, it is checked whether the position of a camera that is to generate the video signal corresponding to the clicked position is displayed on the map window in FIG. 3 when the video is clicked. If NO in step S114, an instruction to switch the map so as to display the map including the camera on the window in FIG. 3 is given to the map management software 413.

In step S116, the focus is switched to the focus of the camera corresponding to the clicked video as in step S108.

In step S118, the display movement control/stop processing routine to be described later is started. This routine will be described later with reference to FIG. 20.

In step S120, it is checked whether the camera control panel 640 in FIG. 3 is clicked. If YES in step S120, the flow branches to step S122.

In step S122, the command designated with the control panel is transmitted to the camera corresponding to the clicked point through the network 100.

In step S124, it is checked whether any of the tags 510 to 540 on the map in FIG. 3 is clicked. If YES in step S124, the flow advances to step S126. If NO in step S124, the flow advances to step S128.

In step S126, an instruction to display the map corresponding to the clicked one of the tags 510 to 540 on the map is sent to the map management software 413.

In step S128, it is checked whether any video is designated as a video to be displayed by being D & D onto the map displayed on the bitmap display 35. If YES in step S128, the flow advances to step S130. If NO in step S128, the flow advances to step S136.

If a designated video is present, packets including video request signals are sequentially transmitted to the camera or the video signal transmission terminal corresponding to the video, and the video sent from the terminal which is requested by the packets to transmit the video are displayed on the bitmap display 35 in step S130. An address, on the network, which designates the camera or the video signal transmission terminal corresponding to the video is added to such a packet.

In step S132, it is checked whether the grouping button is clicked. If YES in step S132, the flow advances to step S134. If NO in step S132, the flow advances to "C".

In step S134, the cameras, on the bitmap display 35, which are transmitting camera video are grouped, and a group icon is formed.

In step S136, it is checked whether the group icon is clicked. If YES in step S136, the flow advances to step S138. If NO in step S136, the flow advances to "B".

In step S138, the clicked group icon is displayed invertedly.

In step S140, it is checked whether group display is instructed. If YES in step S140, the flow advances to step S142, i.e., the flow chart for group display in FIG. 23 (to be described later). If NO in step S140, the flow advances to step S144.

In step S144, it is checked whether the group deletion button 710 is clicked. If YES in step S144, the flow advances to step S146. If NO in step S144, the flow advances to "B".

In step S146, the designated group is deleted.

Figure 18:
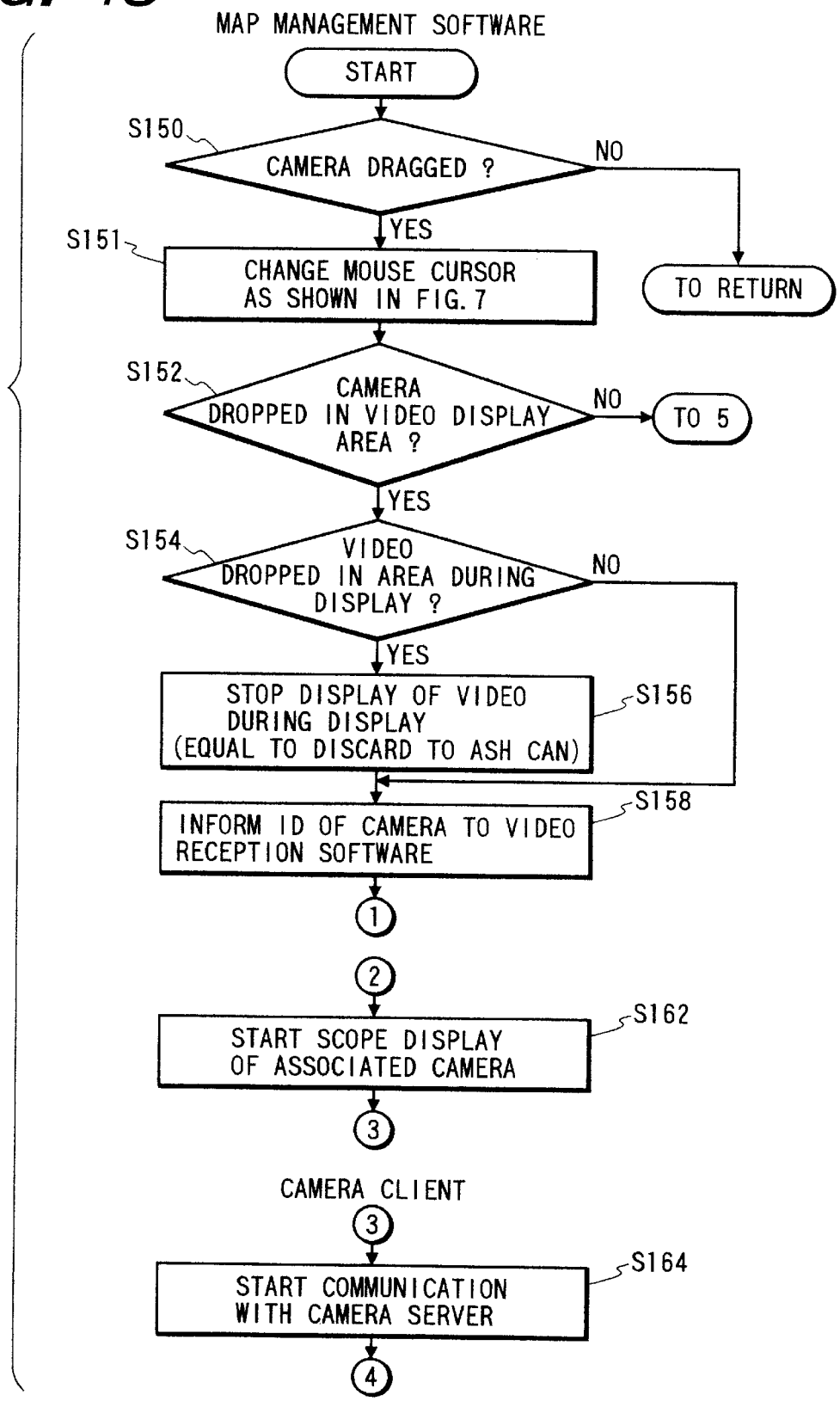
FIG. 18 is a flow chart showing the operation of map management software in display processing.
Figure 19:
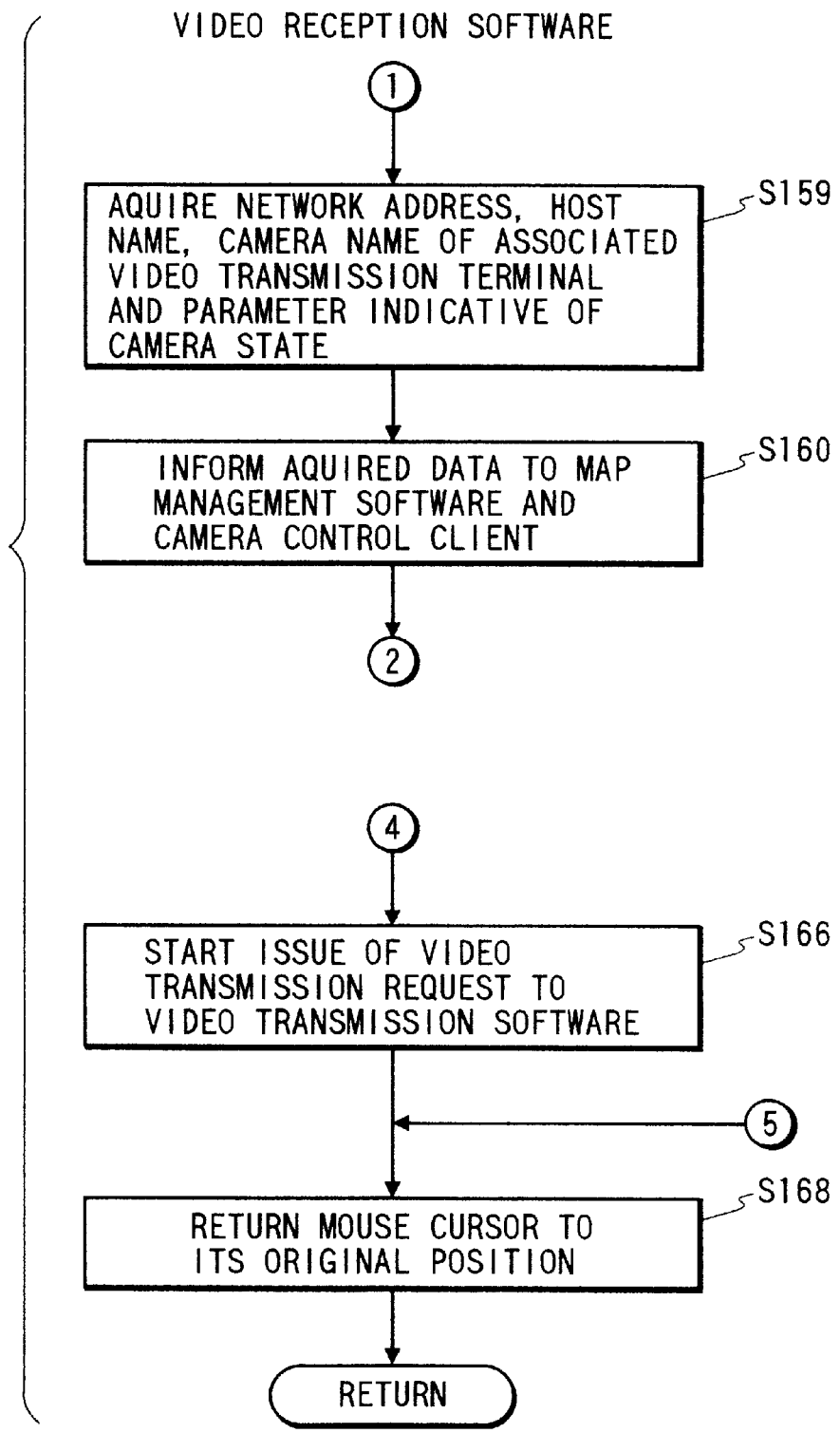
FIG. 19 is a flow chart showing the operation of video reception software in display processing.

The above display processing routine in step S110 will be described next with reference to FIG. 18.

According to this routine, in step S150, it is checked whether any of the displayed camera icons is dragged. According to this flow chart, if the mouse cursor is set to the camera icon and the mouse button is kept depressed from step S106 in FIG. 15 to this step, the flow advances to step S151. If the user has released the depressed state of the mouse button, this step is terminated, and the flow returns to the main routine.

In step S151, the display of the mouse cursor is changed to the state shown in FIG. 7 while the camera icon is dragged, thereby allowing the user to easily recognize that the camera icon is being dragged. This mouse cursor is not limited to this display form, and may be displayed in another form as long as the user can recognize that the camera icon is being dragged.

In step S152, it is checked, on the basis of the state of the click button of the mouse 128 in FIG. 1, whether the cursor in the form of a camera in FIG. 7 is dropped. It is then checked if the dropped camera icon is dropped in any of the video display areas 610 to 620 in FIG. 5. In performing such determination step, the map management software 413 compares each of the video display areas 610 to 620 with the coordinates at which the cursor in the form of a camera is dropped. If the cursor is dropped inside any area, the flow branches to step S154. If the cursor is dropped outside any area, the flow branches to step S168 to return the mouse cursor to its original position. That is, in step S150, the mouse cursor is returned to the state before he camera icon is dragged.

In step S154, the video reception software 412 checks whether any video is being displayed in the area in which the video is dropped. The video reception software 412 performs management by constantly writing, in a table memory, information indicating that a video from a specific camera is being displayed in a specific one of the above video display areas 610 to 620. If YES in step S154, the flow advances to step S156. If NO in step S154, the flow advances to step S158.

If it is determined that a video is being displayed in the area in which the video is dropped, the display of the video is stopped in step S156.

In step S158, the video reception software 412 in FIG. 2 is notified of the ID (identification information) of the camera corresponding to the D & D video.

In step S159, the network address of the camera whose ID is notified in step S158, the host name, the camera name, and the parameters indicating the state of the camera are acquired from the main memory 124. These parameters include focal length information, white balance information, and data indicating the photographing direction. Note that the network addresses of all image signal sources constituting this system, the host names, the camera names, and the parameters representing the states of the cameras are stored in the main memory 124.

In step S160, the data acquired in step S159 are output to the map management software 413 and the camera control client 411.

In step S162, scope display of the camera, indicated by, e.g., reference numeral 580 in FIG. 6, is performed, that is, the field angle of the camera, the focal length information, and the direction of the camera are displayed on the map on the basis of the data acquired in step S160.

In step S164 following step S162, the video reception software 412 communicates with the camera control server 421.

In step S166, in order to receive a video signal from the selected camera, the video reception software 412 sends a video request signal to the video transmission software 422 of the video transmission terminal to which the camera which is providing the currently displayed video is connected. The video reception software 412 periodically outputs the above video request signal until transmission of a video signal is stopped in step S178.

With this operation, one-frame image signals are repeatedly output from the video camera side to reproduce a moving image on the monitor.

In step S168, the mouse cursor which has been moved upon drag and drop of the video is returned to is original position.

Figure 20:
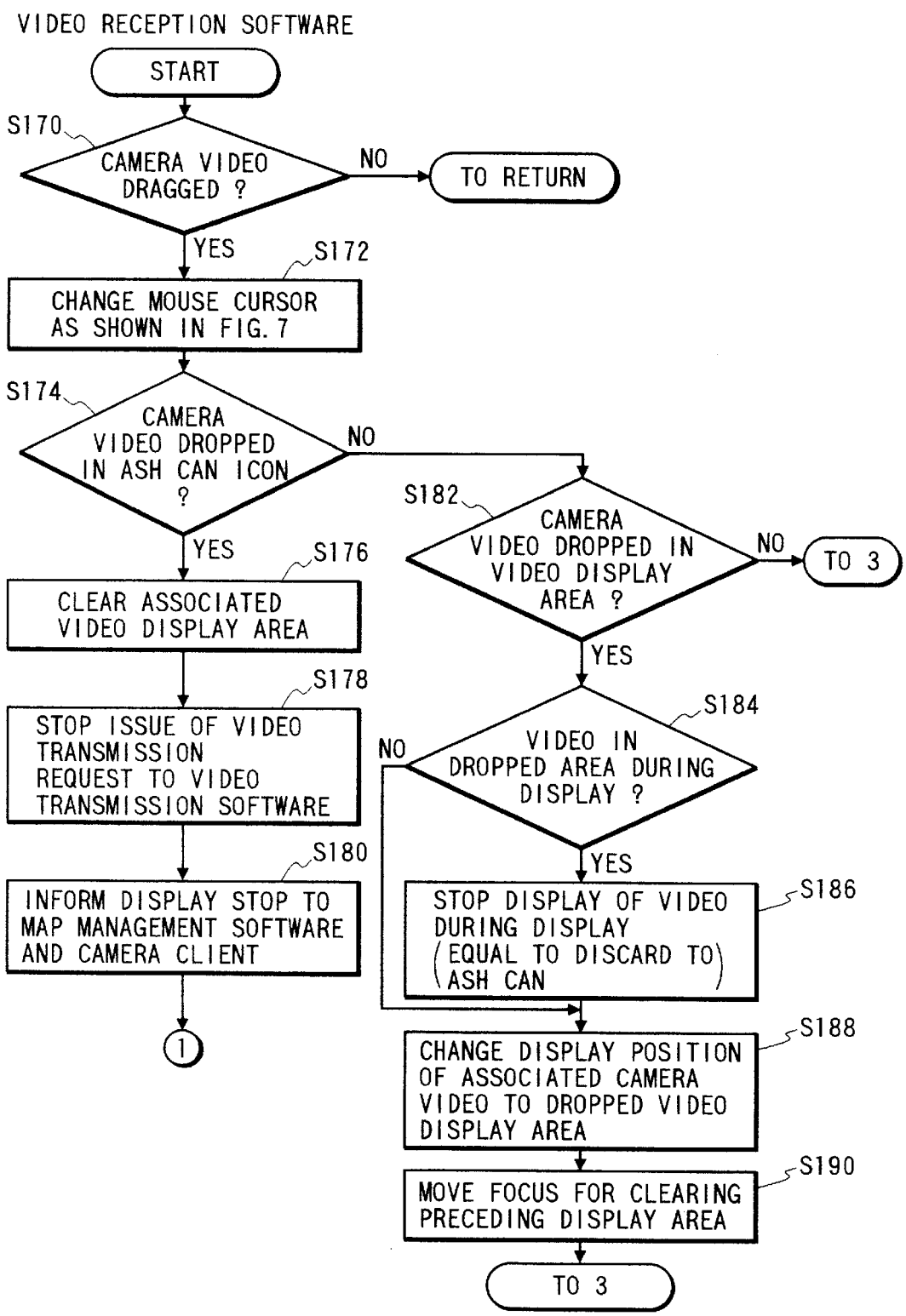
FIG. 20 is a flow chart showing video reception software in display stop processing and position movement processing.
Figure 21:
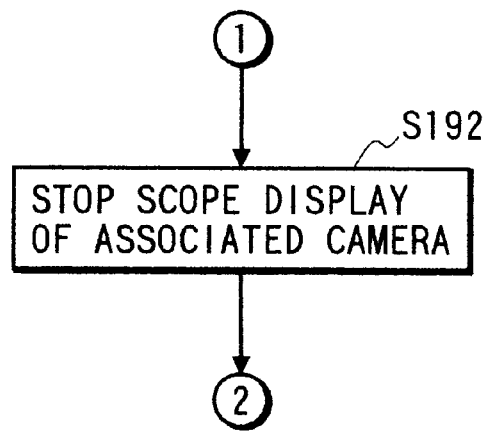
FIG. 21 is a flow chart showing the operation of the map management software in display stop processing and position movement processing.
Figure 22:
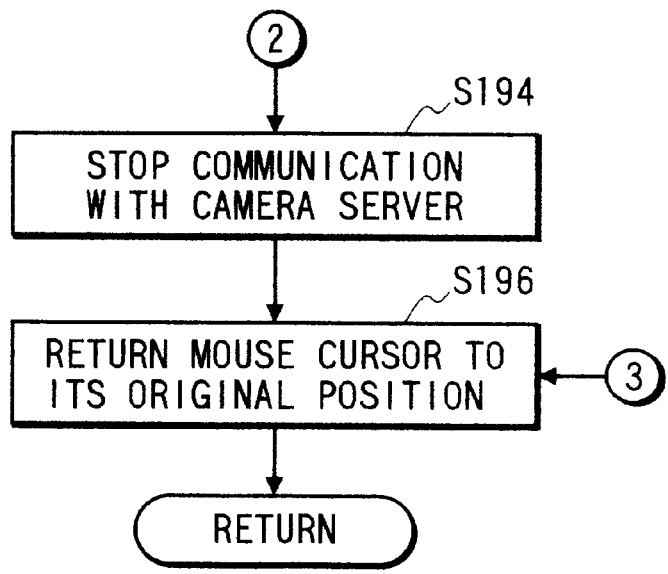
FIG. 22 is a flow chart showing the operation of a camera client in display stop processing and position movement processing.

The display movement stop processing routine in step S118 in FIG. 15 will be described next with reference to FIGS. 20 and 21.

In step S170, it is checked whether the video clicked in step S112 is kept clicked. If YES in step S170, the flow advances to step S172. If NO in step S170, this routine is terminated.

In step S172, the shape of the mouse cursor is changed, for example, as shown in FIG. 7, as in step S151.

In step S174, it is checked whether the video dragged with the mouse cursor is dropped in the ash can. If YES in step S174, the flow advances to step S176. If NO in step S174, the flow advances to step S182.

If it is determined that the video is dropped in the ash can, the video display area in which the video is D & D is cleared and changed into the state with no display or the blue background in step S176.

In step S178, the video reception software 412 stops issuing the video transmission request to the video transmission terminal which has been transmitting the video cleared in step S176. With this operation, the communication terminal side stops communication of the video signal.

In step S180 following step S178, the map management software 413 and the camera control client 411 are notified of display stop on the bitmap display 135, and the flow advances to step S192.

If it is determined in step S174 that the camera video is not dropped in the ash can, it is checked in step S182 whether the camera video is dropped any of the video display areas 610 to 620.

In step S184, the same operation as in step S154 is performed.

In step S186, the same operation as in step S156 is performed.

In step S188, the video signal from the camera corresponding to the D & D camera video is displayed at the video display position where the video is dropped.

In step S190, the video signal in the area in which the video signal from the camera has been displayed is cleared.

In step S192, the scope display of the camera displayed in step S162 is deleted.

In step S194, communication with the camera server is stopped.

In step S196, the same operation as in step S168 is performed.

Figure 23:
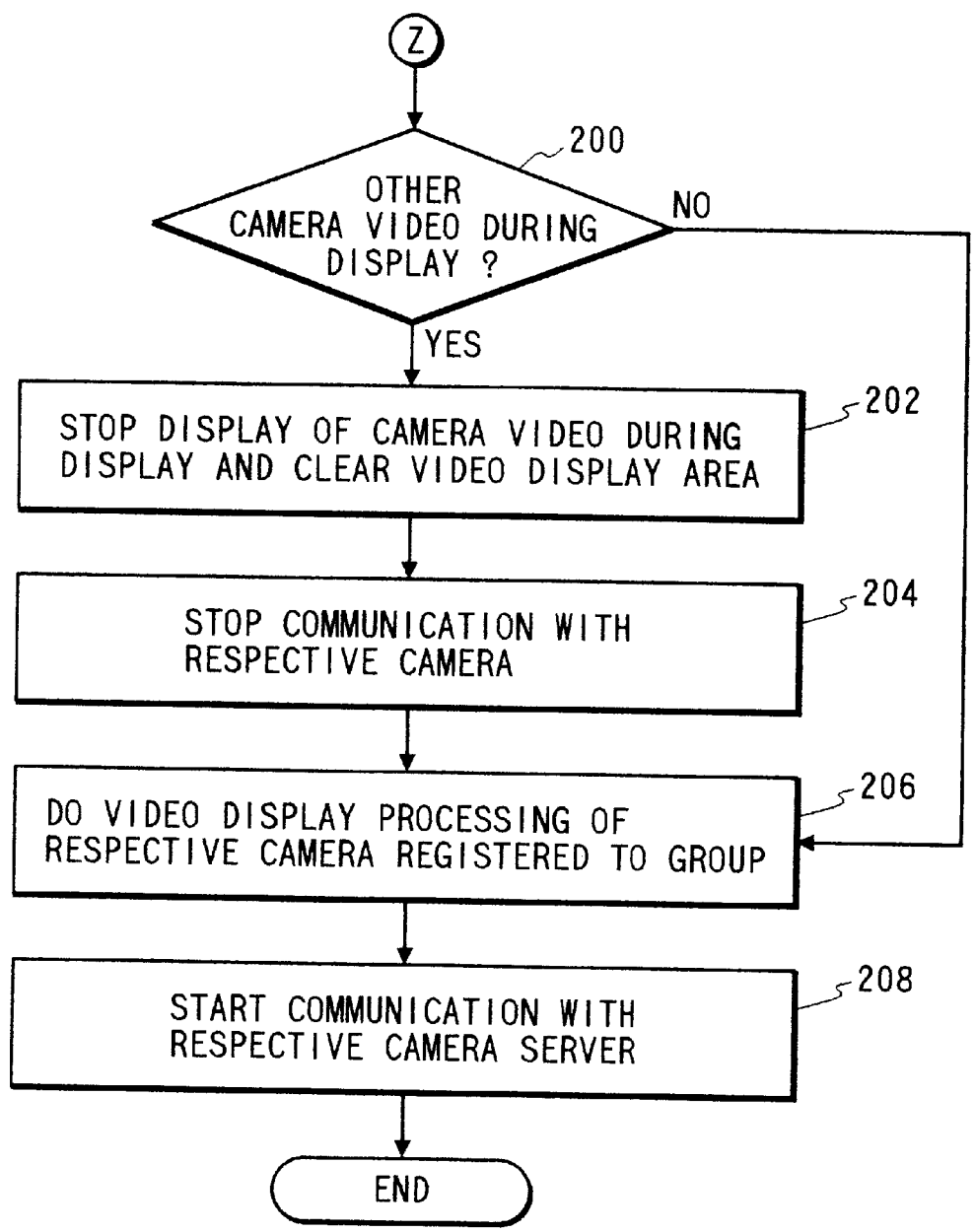
FIG. 23 is a flow chart for group display processing.

The group display processing in step S142 will be described with reference to the flow chart of FIG. 23.

In step S200, it is checked whether the camera video transmitted from the camera is being displayed on the bitmap display 35.

In step S202, since the camera video is displayed on the bitmap display 35, display of the camera video is stopped, and the video display area is cleared.

In step S204, communication with the camera which is transmitting the camera video stopped in step S202 is stopped.

In step S206, display processing for video from the respective cameras registered in the group is performed. (The video reception software 412 in FIG. 2 is notified of the ID (identification information) of each camera registered in the group. Subsequently, the network address of each camera, whose ID is notified, the host name, the camera name, and the parameters indicating the state of the camera are acquired from the main memory 124. These parameters include focal length information, white balance information, and data indicating the photographing direction. Note that the network addresses of all image signal sources constituting this system, the host names, the camera names, and the parameters representing the states of the cameras are stored in the main memory 124. The acquired data is output to the camera control client 411.)

In step S208, the camera control client 411 starts communication with the camera control server of each camera through the network.

Second Embodiment

A method of forming a group icon on the map display window will be described below.

The second embodiment is realized by adding a camera icon selection means, a group formation means, and a group deletion means to the map display window in the first embodiment. Note that each means can be realized by a pull-down menu or buttons without posing any problem. One of the methods of realizing these functions will be described below.

A camera is selected by clicking the corresponding camera icon. When the camera icon is clicked, the color of the frame of the camera icon changes to indicate that the camera is in the selected state. Changing the color allows the user to know that the corresponding camera is selected. At this time, when another camera icon is clicked, the previously selected camera is set in the non-selected state, and the camera corresponding to the clicked icon is set in the selected state. A plurality of cameras can be set in the selected state by clicking the corresponding camera icons while pressing the "Shift" button of the keyboard.

Figure 14:
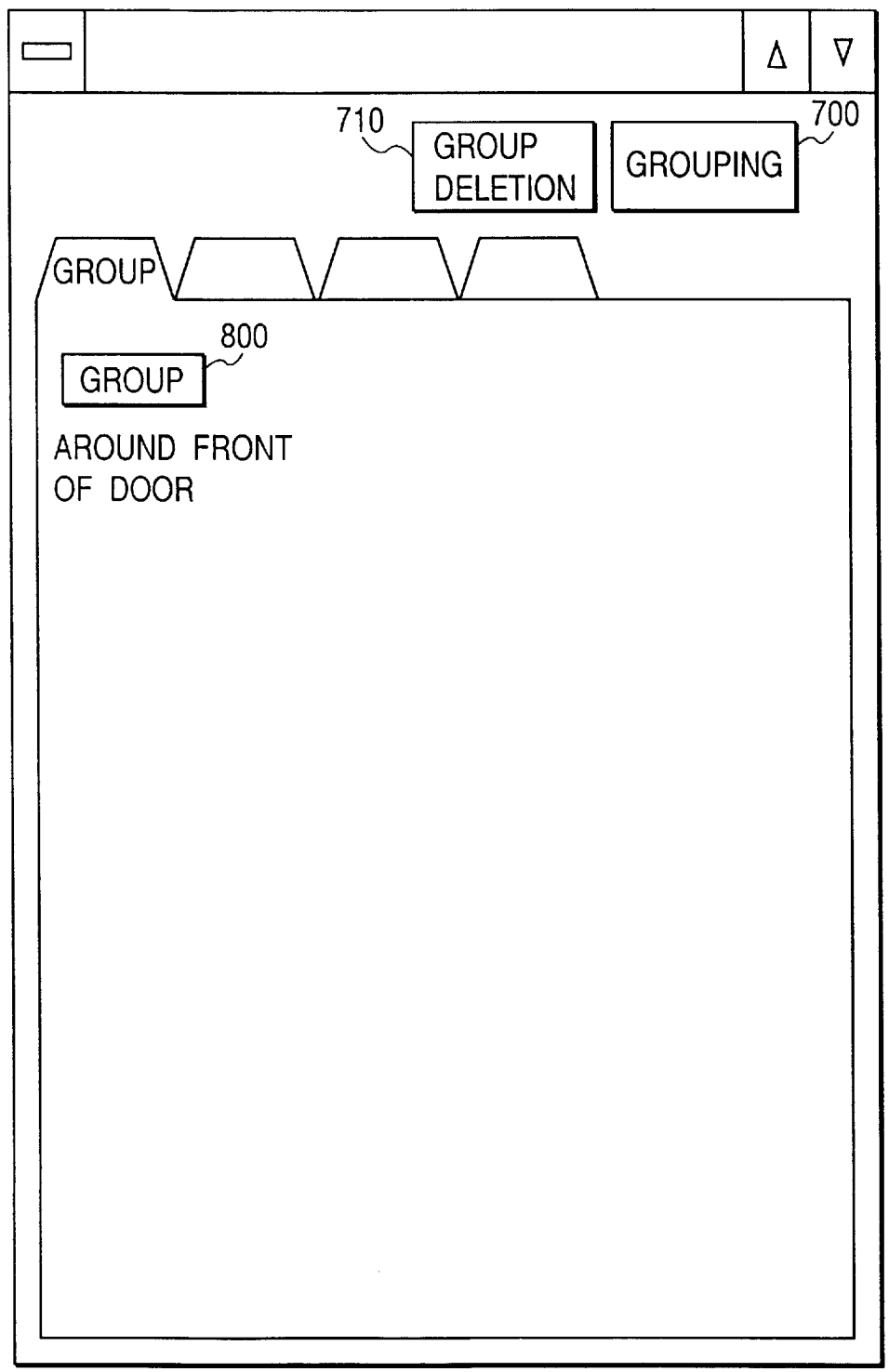
FIG. 14 is a view showing an example of the map display window having group formation and deletion means.

Group formation processing is applied to the selected cameras. When a plurality of arbitrary cameras are selected, a grouping button 700 on the map display window in FIG. 14 is clicked. As a result, a group formation dialog 720 appears to allow the user to form a group. A group icon is then formed in the same manner as in the first embodiment.

By selecting the formed group icon, the corresponding video can be displayed on the video display window as the first embodiment. When the group icon is selected, the selected state is expressed by displaying the group icon name invertedly, unlike the case wherein each camera icon is selected.

A group can be deleted by selecting the corresponding group icon and clicking a group deletion button 710 on the map display window.

A group can be displayed on the video display window by drag and drop the group icon as in the first embodiment. Alternatively, a group may be displayed by selecting the corresponding group icon and clicking a group display button formed on the map display window.

Cameras to be grouped need not be designated on the video widow and the maps, but may be designated by the IDs of the cameras in accordance with a list of the IDs of the cameras which is formed when the system is set.

By using the concept of groups in this manner, camera video can be displayed without sequentially drag and drop the camera icons, thereby reducing the expense of time and effort.

In addition, since the user can arbitrarily form cameras present on a plurality of maps into a group on a map different from the maps set on fixed planes, the system can be flexibly used.

By using the concept of groups in the above manner, an improvement in operability can be attained in displaying image data from a plurality of desired video transmission terminals. In addition, a further improvement in operability can be attained by grouping a plurality of terminals which provide video that must be displayed often.

Since a grouping instruction is issued on the map which indicates the installed state of the video transmission terminal, the instruction can be issued in consideration of the positional relationship.

Since a group can be formed from a plurality of maps, a grouping instruction for a plurality of video transmission terminals which cannot be expressed on one map can be issued.

Since a map indicating the installed states of a plurality of video transmission terminals is displayed on the monitor on which image data received from the video transmission terminals are displayed, the display space can be reduced. In addition, the positions of video transmission terminals which are providing video that are being displayed can be easily recognized.

Set groups can be displayed, and the group names can be used in displaying the groups. For this reason, even if a plurality of groups are set, the user can designate the group to be displayed without making any mistake.

Image data received from a plurality of designated terminals can be monitored without performing display switching and the like, improving the operability.

In addition, groups can be easily canceled.

Furthermore, video transmission terminals can be grouped upon confirmation of image data received therefrom.

What is claimed is:

1. A communication apparatus comprising:
  designating means for designating a plurality of desired terminals of a plurality of video transmission terminals;
  generating means for forming said plurality of desired terminals into a group and generating a symbol representing said group;
  operating means for operating the symbol; and
  output means for outputting image data received from said plurality of desired terminals included in said group to a monitor in accordance with the operation of the symbol.

2. An apparatus according to claim 1, further comprising a map indicating installed states of said video transmission terminals, and wherein said designating means performs a designating operation on said map.

3. An apparatus according to claim 2, wherein said map comprises a plurality of maps, and said designating means performs a designating operation on said plurality of maps.

4. An apparatus according to claim 2, wherein said map indicating the installed states of said video transmission terminals is output onto the monitor, and a display form of said plurality of terminals is changed in accordance with the designating operation.

5. An apparatus according to claim 2, wherein an icon indicating said video transmission terminal is displayed on said map in accordance with an installation position.

6. An apparatus according to claim 5, wherein a shape of the icon is changed in accordance with an icon designating operation performed by said designating means.

7. An apparatus according to claim 2, wherein the installed state of said video transmission terminal is an installation position of said video transmission terminal.

8. An apparatus according to claim 1, further comprising setting means for setting a name of said group, the group name being displayed as the symbol on the monitor.

9. An apparatus according to claim 1, wherein said output means is multi-image display means for performing multi-image display of the image data, received from said plurality of terminals, on the monitor in accordance with access to the symbol.

10. An apparatus according to claim 1, further comprising canceling means for canceling said group.

11. An apparatus according to claim 1, wherein the image data received from said plurality of desired terminals are displayed on the monitor upon a designating operation by said designating means.

12. A communication method comprising the steps of:
  designating a plurality of desired terminals of a plurality of video transmission terminals;
  forming said plurality of desired terminals into a group and generating a symbol representing said group;
  operating the symbol; and
  outputting image data received from said plurality of desired terminals included in said group to a monitor in accordance with the operation of the symbol.

13. A method according to claim 12, further comprising the step of performing the designating operation on a map indicating installed states of said video transmission terminals.

14. A method according to claim 13, wherein said map comprises a plurality of maps, and the designating operation is performed on said plurality of maps.

15. A method according to claim 13, further comprising the step of outputting said map indicating the installed states of said video transmission terminals onto the monitor, and changing a display form of said plurality of terminals in accordance with the designating operation.

16. A method according to claim 13, wherein an icon indicating said video transmission terminal is displayed on said map in accordance with an installation position.

17. A method according to claim 16, wherein a shape of the icon is changed in accordance with an icon designating operation performed by said designating step.

18. A method according to claim 13, wherein the installed state of said video transmission terminal is an installation position of said video transmission terminal.

19. A method according to claim 12, further comprising the step of setting a name of said group by using setting means, the group name being displayed as the symbol on the monitor.

20. A method according to claim 12, wherein the step of outputting the image data comprises the step of displaying the image data, received from said plurality of terminals, as a multi-image on the monitor in accordance with access to the symbol.

21. A method according to claim 12, further comprising the step of canceling said group.

22. A method according to claim 12, further comprising the step of displaying the image data received from said plurality of desired terminals on the monitor upon completion of the designating operation.

23. An article of manufacture comprising:
  a computer readable medium having computer usable program code embodied therein, said computer usable program code containing executable instructions that when executed, cause a computer to perform the steps of:
  designating a plurality of desired terminals of a plurality of video transmission terminals;
  forming said plurality of desired terminals into a group and generating a symbol representing said group;
  operating the symbol; and
  outputting image data received from said plurality of desired terminals included in said group to a monitor in accordance with the operation of the symbol.

24. The article of manufacture of claim 23, wherein said designating operation is performed on a map indicating installed states of said video transmission terminals.

25. The article of manufacture of claim 24, wherein said map comprises a plurality of maps, and the designating operation is performed on said plurality of maps.

26. The article of manufacture of claim 24, wherein said program code further includes instructions that, when executed, cause a computer to perform the step of outputting said map indicating the installed states of said video transmission terminals onto the monitor, and changing a display form of said plurality of terminals in accordance with the designating operation.

27. The article of manufacture of claim 24, wherein an icon indicating said video transmission terminal is displayed on said map in accordance with an installation position.

28. The article of manufacture of claim 27, wherein a shape of the icon is changed in accordance with an icon designating operation performed by said designating step.

29. The article of manufacture of claim 24, wherein the installed state of said video transmission terminals is an installation position of said video transmission terminal.

30. The article of manufacture of claim 23, wherein said program code further includes instructions that, when executed, cause a computer to perform the step of setting a name of said group by using setting means, the group name being displayed as the symbol on the monitor.

31. The article of manufacture of claim 23, wherein the step of outputting the image data comprises the step of displaying the image data, received from said plurality of terminals, as a multi-image on the monitor in accordance with access to the symbol.

32. The article of manufacture of claim 23, wherein said program code further includes instructions that, when executed, cause a computer to perform the step of canceling said group.

33. The article of manufacture of claim 23, wherein said program code further includes instructions that, when executed, cause a computer to perform the step of displaying the image data received from said plurality of desired terminals on the monitor upon completion of the designating operation.

* * * * *